United States Patent [19]

Morena

[11] Patent Number: 6,048,811
[45] Date of Patent: Apr. 11, 2000

[54] FUSION SEAL AND SEALING MIXTURES

[75] Inventor: Robert Morena, Caton, N.Y.

[73] Assignee: Corning Incorporated, Corning, N.Y.

[21] Appl. No.: 09/125,843

[22] PCT Filed: Feb. 11, 1997

[86] PCT No.: PCT/US97/02162

§ 371 Date: Aug. 21, 1998

§ 102(e) Date: Aug. 21, 1998

[87] PCT Pub. No.: WO97/30949

PCT Pub. Date: Aug. 28, 1997

Related U.S. Application Data

[60] Provisional application No. 60/013,584, Feb. 21, 1996.
[51] Int. Cl.[7] ....................................................... C03C 8/24
[52] U.S. Cl. .................................. 501/15; 501/17; 501/45
[58] Field of Search ................................. 501/15, 17, 45

[56] References Cited

U.S. PATENT DOCUMENTS

| | | | |
|---|---|---|---|
| 5,122,484 | 6/1992 | Beall et al. | 501/15 |
| 5,246,890 | 9/1993 | Aitken et al. | 501/15 |
| 5,281,560 | 1/1994 | Francis et al. | 501/15 |
| 5,514,629 | 5/1996 | Morena | 501/15 |
| 5,516,733 | 5/1996 | Morena | 501/15 |

*Primary Examiner*—Karl Group
*Attorney, Agent, or Firm*—Milton M. Peterson

[57] ABSTRACT

A fusion sealing material, and a fusion seal prepared therefrom, consisting essentially of at least 65% of a SnO—ZnO—$P_2O_5$ glass frit, up to 10% of a crystallization catalyst and 0–25% of an additive that decreases the effective CTE of a seal prepared with the material.

10 Claims, No Drawings

FUSION SEAL AND SEALING MIXTURES

This application claims the benefit of U.S. Provisional Application No. 60/013,584, express mailed Feb. 21, 1996, entitled FUSION SEAL AND SEALING MIXTURES, by Robert Morena.

FIELD OF THE INVENTION

A fusion sealing material comprising a tin-zinc-phosphate glass frit and a crystallization catalyst, and a fusion seal produced therefrom.

BACKGROUND OF THE INVENTION

The invention is broadly applicable to forming a seal with, or between, glass, metal and ceramic components. It is particularly applicable to producing envelopes for cathode ray tubes. However, it also finds application in other types of display devices and in lighting products.

It is customary in producing cathode ray tube envelopes to press funnel and faceplate components separately. These components are then joined with a fusion seal employing a mid-temperature sealing glass frit.

A successful sealing glass frit must provide adequate flow at the sealing temperature to allow the glass to wet the substrate and form a seal therewith. It must also provide a coefficient of thermal expansion (CTE) that is compatible with the CTE of the substrate.

Where a sealed device, such as a cathode ray tube, must be baked out, that is reheated under vacuum, there is a further requirement. The seal must exhibit a high viscosity at the temperature of the bakeout to avoid any visco-elastic distortion of the seal. This requirement is seemingly contradictory to the requirement of adequate flow.

These contradictory requirements are currently met by devitrifying glass frits based on $PbO$—$ZnO$—$B_2O_3$ compositions. The key to their successful performance is the addition of a small amount of a crystallization-inducing catalyst as a powdered addition to the ball-milled base frit. The crystallization catalyst serves as a source of heterogeneous nucleation. After a brief period of flow at sealing temperatures, the frit will then undergo crystallization and become rigid. Accompanying this crystallization is a rapid change in frit viscosity, with the softening point of the fit increasing from about 350° C. to approximately 575° C.

The lead-zinc-borate glasses have proven very successful for the purpose. However, there has been a continuing search for a sealing material having even better sealing characteristics. Recently, this search has been accelerated by the desire to eliminate lead as a glass component.

The materials search led to development of tin-zinc-phosphate glasses as described in U.S. Pat. No. 5,246,890 (Aitken et al.) and U.S. Pat. No. 5,281,560 (Francis et al.). The glasses described in these patents are lead-free, and provide somewhat lower sealing temperatures in the range of 400–450° C. with hold times no more than an hour.

The Aitken et al. glasses are of particular interest for use in producing seals in cathode ray tube envelopes because of their relatively low tin oxide contents. In addition to being lead-free, these glasses have compositions containing 25–50 mole % $P_2O_5$ and SnO and ZnO in amounts such that the mole ratio of SnO:ZnO is in the range of 1:1 to 5:1. The glass compositions may further contain up to 20 mole % of modifying oxides including up to 5 mole % $SiO_2$, up to 20 mole % $B_2O_3$, and up to 5 mole % $Al_2O_3$. They may also contain one or more crystallization promoters selected from 1 to 5 mole % zircon and/or zirconia and 1–15 mole % $R_2O$. Additionally, the composition may include a seal adherence promoter selected from up to 5 mole % $WO_3$, up to 5 mole % $MoO_3$, up to 0.10 mole % Ag metal and mixtures.

Frits in this composition area exhibit good flow at sealing temperatures. With the addition of suitable expansion-modifying fillers, they can be made compatible with a wide range of substrates. Such mill additions are described in the Aitken et al. and Francis et al. patents mentioned earlier.

While these non-lead glass frits form good seals, they have presented difficulties with respect to surviving a bake-out and exhaust procedure. My related application, Ser. No. 08/512,618, filed Aug. 8, 1995 as a C-I-P of Ser. No. 08/221,400, addresses the problem with a sealing material consisting essentially of 60–90% of glass frit and 10–40% of a mill addition including 10–30% alumina and 0–30% zircon. While the mill addition is a necessary component of that invention, it is not consistently effective by itself. In addition, it is necessary to develop a small amount, preferably 5–10%, of a crystal phase in a seal produced with the material.

Development of sufficient crystal phase to be effective requires a time-temperature sealing cycle that is often impractical. Thus, the sealing temperature may range from a 450° C. minimum up to 475° C. The time required at the lower end of the temperature range may be an hour or more. Such a time-temperature cycle is, of course, well above the conventional cathode ray tube sealing cycle of 430–450° C. for times of 30 to 45 minutes.

It is a purpose of the present invention to provide a fusion sealing material based on a $SnO$—$ZnO$—$P_2O_5$ glass frit, and capable of producing a seal that remains rigid at a temperature as high as 550° C. Another purpose is to provide a sealing material containing a $SnO$—$ZnO$—$P_2O_5$ glass frit that can be substantially thermally crystallized. A further purpose is to provide a sealing material containing an additive that catalyzes such thermal crystallization. A still further purpose is to provide a sealing material that can be fused to a tight, rigid seal employing the conventional sealing cycle for cathode ray tubes.

SUMMARY OF THE INVENTION

The present invention resides in part in a fusion sealing material consisting essentially of at least 65% of a $SnO$—$ZnO$—$P_2O_5$ glass fit, up to 10% of a finely-divided, crystallization catalyst selected from the group consisting of alumina, $BaTiO_3$ and ZnO, and 0–25% of an additive that decreases the effective CTE of the material, the glass frit having a composition, in terms of mole % on an oxide basis, consisting essentially of 26–33 mole % $P_2O_5$, 0–2% $B_2O_3$, 0–1% $Al_2O_3$, and SnO and ZnO in a mole ratio greater than about 3.0.

The invention further resides in a fusion seal consisting essentially of the sealing mixture in a fused and crystallized state.

BRIEF DESCRIPTION OF THE DRAWING

FIGS. 1 and 2 in the accompanying drawing are graphical representations of x-ray diffraction scans showing crystal patterns.

PRIOR ART

Prior literature of possible relevance is listed and described in an accompanying document.

DESCRIPTION OF THE INVENTION

The $SnO$—$ZnO$—$P_2O_5$ glasses disclosed in the Aitken et al. and Francis et al. patents have been recognized as a potential answer to the need for a non-lead, mid-temperature, sealing glass frit. These glasses are capable of softening and wetting a substrate at moderate sealing temperatures in the 400–450° C. range. However, because of their resistance to controlled crystallization, they are at a distinct disadvantage with respect to crystallizable, lead borate glasses. A seal produced with the non-lead glasses tends to soften and deform during a vacuum bakeout.

The present invention arose from continuing efforts to find a means of inducing controlled crystallization in the non-lead, sealing glass frits. Earlier work had shown that the resistance to crystallization decreased with lesser amounts of $P_2O_5$ in the glass composition. However, when crystallization occurred, it tended to occur spontaneously, that is, in an uncontrolled manner. This, of course, defeated the purpose since control was necessary to provide a strong seal.

Accordingly, interest has centered on a non-lead frit having a pyrophosphate, or near pyrophosphate, stoichiometry (33 mole % $P_2O_5$). Various mill additions to such a glass frit have been proposed to improve seal strength, to provide a higher fired viscosity, and to diminish CTE. In particular, the Aitken et al. and Francis et al. patents describe mill additions that provide a lower effective CTE in a seal. These mill additions include metal pyrophosphate crystalline material, cordierite, solid solutions of beta-eucryptite or beta-spodumene, silica glasses, quartz, and a metal alloy, Invar.

It has been recognized, however, that the ultimate answer to a successful mid-temperature sealing material would be a SnO—ZnO—$P_2O_5$ frit-based material that mirrored the lead-zinc-borate-based materials. Such a material would become fluid at an acceptable sealing temperature and wet the substrate. It would then undergo a delayed crystallization to produce a highly crystalline seal that would remain rigid at higher temperatures.

The present invention provides a sealing glass mixture that is capable of controlled, that is, delayed, crystallization. The frit in the sealing glass mixture undergoes initial flow to form a seal. Once sufficient glass flow has occurred to wet the substrate, the glass crystallizes to the extent of at least about 75%, and usually in excess of 90%. The result is a seal that remains rigid and unyielding up to temperatures on the order of 550° C.

The sealing glass mixture comprises a SnO—ZnO—$P_2O_5$ frit of selected composition, a crystallization catalyst and, optionally, an additive that reduces the effective CTE of the seal.

The glass frit composition lies intermediate to the orthophosphate (25% $P_2O_5$) and pyrophosphate (33% $P_2O_5$) stoichiometric. The former tends to devitrify too rapidly, the latter generally resists crystal formation at sealing temperatures of 400–450° C. Also, durability decreases rapidly above about 33% $P_2O_5$.

For present purposes, the composition ranges of the SnO—ZnO—$P_2O_5$ glass frit consist essentially of, in mole % on an oxide basis, 26–33% $P_2O_5$, preferably 26.5–29%, 0 to 2% $B_2O_3$, SnO and ZnO in a ratio of at least 3.0:1, and preferably above 5:1. The presence of $B_2O_3$ lowers the CTE of the glass frit. It also raises the viscosity at the sealing temperature, thus limiting the $B_2O_3$ content to 2%, and preferably under 1.5%. Glass flow at sealing temperature, and/or ability to use a lower sealing temperature, improve as the SnO:ZnO ratio increases. Accordingly, a ratio over 5:1, and preferably over 10:1, is desirable. However, SnO is expensive and this imposes a practical limit of about 20:1. Up to about one mole % each of alumina and $WO_3$ have been found useful and are optional glass components.

The crystallization catalyst is selected from a group consisting of alumina, barium titanate and zinc oxide (ZnO). Of the group, alumina is the preferred catalyst.

It is necessary that the catalyst material be very finely divided, although the optimum particle size varies with the material. Work with alumina has employed commercially available materials of 0.5 and 3.0 micron particle size. The latter has proved marginally useful. Accordingly, average particle size should be less than 3.0, and preferably is less than 1.0 microns.

Barium titanate and ZnO have been used in somewhat larger particle sizes than that of the alumina since such materials are only commercially available in such sizes. However, these catalysts are less effective than the fine alumina. The catalyst may constitute up to 10%, preferably about 5%, of the sealing material. Larger amounts tend to interfere with glass flow and the formation of a strong seal.

The additive to reduce the effective CTE of a seal may be any compatible material of known lower CTE than the glass flit. Such materials include lithium aluminosilicate glass-ceramics, such as beta-eucryptite and beta-spodumene, cordierite, crystalline pyrophosphates, particularly Mg and/or Co, fused silica, high silica glasses and an alloy Invar. These materials may constitute up to 30% of the sealing material depending on the degree of CTE lowering required. However, for good glass flow, a maximum amount of 25% is preferred.

The glass fit constitutes at least 65% of the sealing material. The remainder is mill additions as indicated. The mill additions may also include a filler, such as zircon, which exerts some influence on the CTE. The glass frit preferably has a particle size in the range of 20 to 30 microns. The mill additives may be mixed together and added to the fit. Alternatively, they may be added individually. In any case, a suitable vehicle is added, and the mixture rolled, to form a homogeneous paste for application to a sealing surface or substrate.

SPECIFIC EMBODIMENTS

TABLE IA sets forth, in mole % on an oxide basis, the compositions for a series of SnO—ZnO—$P_2O_5$ glasses exemplifying the invention. TABLE IB sets forth the same compositions in weight percent.

TABLE IA

| Composition | 1 | 2 | 3 | 4 | 5 | 6 |
|---|---|---|---|---|---|---|
| $P_2O_5$ | 28.5 | 28.5 | 28.0 | 28.5 | 32.0 | 27.2 |
| $B_2O_3$ | — | 1.0 | 1.5 | 1.0 | 1.8 | — |
| ZnO | 6.5 | 6.4 | 6.4 | 10.0 | 3.1 | 6.5 |
| SnO | 65.0 | 63.6 | 63.6 | 60.0 | 61.9 | 65.3 |
| $Al_2O_3$ | — | 0.5 | 0.5 | 0.5 | 0.7 | 1.0 |
| $WO_3$ | — | — | — | — | 0.5 | — |

TABLE IB

| | (wt. %) | | | | | |
|---|---|---|---|---|---|---|
| Composition | 1 | 2 | 3 | 4 | 5 | 6 |
| $P_2O_5$ | 30.4 | 30.5 | 30.1 | 31.1 | 33.8 | 29.1 |
| $B_2O_3$ | — | 0.5 | 0.8 | 0.5 | 0.9 | — |
| ZnO | 4.0 | 3.9 | 3.9 | 6.2 | 1.9 | 4.0 |

TABLE IB-continued

| | (wt. %) | | | | | |
|---|---|---|---|---|---|---|
| Composition | 1 | 2 | 3 | 4 | 5 | 6 |
| SnO | 65.7 | 64.6 | 64.8 | 61.9 | 62.0 | 66.2 |
| $Al_2O_3$ | — | 0.4 | 0.4 | 0.4 | 0.5 | 0.8 |
| $WO_3$ | — | — | — | — | 0.9 | — |

Examples 14 represent preferred compositions with the $P_2O_5$ content being around 28 mole %. However, good results have also been obtained with somewhat higher and lower $P_2O_5$ levels, as illustrated by compositions 5 and 6.

$B_2O_3$ is an optional constituent in the glass compositions. If present, it tends to stabilize the glass and lower the CTE of the base glass. $Al_2O_3$ is also an optional constituent, and serves to improve glass durability.

Glass batches based on these compositions were prepared from readily available raw materials. These included ammonium phosphate, zinc oxide and black tin (SnO). Other materials, capable of yielding the oxide, may be employed as desired. For example, ammonium phosphate might be replaced in whole or in part by phosphoric acid ($H_3PO$). Also, light tin ($SnO_2$) with sugar, or stannous pyrophosphate ($Sn_2P_2O_7$), might be used as the source of stannous oxide (SnO).

The glass batches were ball-milled to obtain homogeneous mixtures, and then introduced into silica crucibles. Each batch was melted at temperatures in the range of 900–1000° C. for 2–4 hours. The melts were poured onto a steel table and rolled into a thin sheet by a heavy steel roller. The sheet was crushed and ball-milled to a powder frit having a mean particle size of about 20–30 microns. Each composition was evaluated in frit form, since data, such as viscosity or expansion data, obtained on a bulk glass are often not relevant in predicting frit behavior.

TABLE II sets forth compositions for two exemplary, sealing glass blends. These blends are formulated using the glass of Example 1 in TABLE I as a base glass frit. The constituent amounts in the blends are given in parts by weight.

TABLE II

| | A | B |
|---|---|---|
| Base glass | 70% | 75% |
| 0.5 μm alumina | 5 | 5 |
| Zircon | 15 | — |
| β-eucryptite | 10 | 15 |
| Co—Mg pyrophosphate | — | 5 |

Each of the sealing material mixtures undergoes crystallization at a normal sealing temperature on the order of 440–450° C. Mixture A was held at a sealing temperature for 45 minutes, and mixture B for an hour. Due to the low viscosity of the base glass frit, both mixtures exhibited good flow prior to crystallization.

As the glass crystallized, the viscosity increased dramatically to provide a softening point on the order of 550° C. This is comparable with the performance obtained with present, commercial, sealing glass mixtures employing lead glass frit.

In each blend, alumina functioned as the crystallization catalyst. It was present as a commercial material having a nominal 0.5 micron particle size. Comparison tests were made with aluminas having 3.0 and 6.0 micron particle sizes. The former was somewhat effective, but control of the crystallization was poor. The 6.0 micron alumina produced little or no crystallization at the sealing temperature involved.

Zircon was an optional ingredient that was present as a filler. The beta-eucryptite and the Co—Mg pyrophosphate were present to reduce the effective CTE of the sealing mixture. Thus, blend A was designed for use in sealing together the funnel and panel of a cathode ray tube. In that case, a CTE of about $95 \times 10^{-7}/°$ C. is desired. Blend B was designed for sealing together the panels in a LCD device. There, the panel glass has a CTE of about $45 \times 10^{-7}/°$ C.

FIGS. 1 and 2 in the accompanying drawing are graphical representations comparing two different crystallization products. Each FIGURE is based on an x-ray diffraction (XRD) scan of a material and represents a crystal pattern. The peaks observed permit determining the presence of a crystal phase and the degree of crystallization.

In each FIGURE, d-spacings, based on angle of rotation as the test piece is rotated, are plotted on the horizontal axis. The counts per second (CPS) are plotted on the vertical axs. Crystal phases are determined by comparing a test pattern with a standard or known pattern for a crystal phase.

FIG. 1 is based on an XRD scan of a fusion seal produced from a blend of sealing material in accordance with my copending application. The blend contained 74% of glass flit, 6% of alumina having an average particle size of 6.0 microns, and 20% zircon. The composition of the frit glass in mole % was 33% $P_2O_5$ and the remainder SnO and ZnO in a mole ratio of 3.5:1. The seal was made by firing at 455° C. for one hour to obtain a crystal phase.

FIG. 2 is based on an XRD scan of a fusion seal produced from a blend of sealing material having the composition of blend A in TABLE II. The seal was made by firing at 455° C., but for a time of only 30 minutes.

In each FIGURE, the peaks indicative of a phosphate crystal phase are indicated by the letter x. The primary peaks, at d-spacings of 3.432 and 3.528, illustrate the difference in degree of crystalation as the difference in height of these peaks from a base line of about 90 CPS and 200 CPS, respectively, in the two patterns. Thus, the much greater height of these primary peaks in FIG. 2 (app. 650–750 cps) versus FIG. 1 (app. 50–100) indicates the great disparity in degree of crystallinity. Those peaks not marked with an X are attributable to filler material.

Three samples of blend A were molded and each was fired at a different temperature for a period of 45 minutes. The temperatures were 440°, 445° and 450° C. X-ray diffraction curves were measured on each fired sample. The resulting curves based on these measurements showed three phosphate crystal peaks at essentially identical points. The only apparent difference in the three curves was in the height of the peaks measured. The higher temperatures had higher peaks indicating a higher degree of crystallization. A test piece prepared using the material illustrated in FIG. 1, but fired at 445° C. for one hour, provided a curve showing only glassy phase with no indication of a phosphate crystal phase.

I claim:

1. A fusion sealing material consisting essentially of at least 65 weight % of a SnO—ZnO—$P_2O_5$ glass frit and a mill addition consisting essentially of an amount up to 10 weight % of a finely divided, crystallization catalyst and 0–25 weight % of an additive that decreases the effective CTE of a seal prepared with the material, the crystallization catalyst being selected from a group consisting of alumina having an average particle size less than 3.0 microns, $BaTiO_3$ and ZnO, and the glass frit consisting essentially, in mole percent on an oxide basis, of 26–33% $P_2O_5$, 0–2% $B_2O_3$, 0–1% $Al_2O_3$, 0–1% $WO_3$ and SnO and ZnO in a mole ratio greater than about 3.0:1.

2. A fusion sealing material in accordance with claim 1 wherein the average particle of the aluminun size is less than 1.0 micron.

3. A fusion sealing material in accordance with claim 1 wherein the crystallization catalyst constitutes about 5 weight % of the sealing material.

4. A fusion sealing material in accordance with claim 1 wherein the $P_2O_5$ content of the glass frit is 26.5–29 mole %.

5. A fusion sealing material in accordance with claim 1 wherein the mole ratio of SnO:ZnO is greater than 5:1.

6. A fusion sealing material in accordance with claim 1 wherein the additive that decreases the CTE is Beta-eucryptite or Co—Mg pyrophosphate.

7. A fusion sealing material in accordance with claim 1 which, optionally, contains up to 15 weight % of the additive that decreases the effective CTE of a seal prepared with the material.

8. A fusion seal consisting essentially of the mixture recited in claim 1 and with the glass frit containing a crystal phase.

9. A fusion seal in accordance with claim 8 wherein the glass frit is at least 75% crystallized.

10. A fusion seal in accordance with claim 9 wherein the glass fit is at least 90% crystallized.

* * * * *